United States Patent [19]

Cheshire

[11] 4,188,064
[45] Feb. 12, 1980

[54] VEHICLE SEAT HINGE MECHANISM

[75] Inventor: Ernest L. Cheshire, Hartwell, England

[73] Assignee: UOP Inc., Des Plaines, Ill.

[21] Appl. No.: 905,482

[22] Filed: May 12, 1978

[30] Foreign Application Priority Data

May 20, 1977 [GB] United Kingdom ............... 21425/77

[51] Int. Cl.² ........................ A47C 1/025; A47C 1/026
[52] U.S. Cl. ...................................... 297/367; 297/373
[58] Field of Search ............... 297/367, 366, 373, 379, 297/355, 368, 369, 370; 16/143, 139, 140

[56] References Cited

U.S. PATENT DOCUMENTS

| 3,479,088 | 11/1969 | Bonnand | 297/366 X |
| 3,840,268 | 10/1974 | Johndrow et al. | 297/367 |
| 4,082,352 | 4/1978 | Bales et al. | 297/367 |

FOREIGN PATENT DOCUMENTS 2322207 11/1974 Fed. Rep. of Germany ........... 297/367

Primary Examiner—William E. Lyddane
Attorney, Agent, or Firm—James R. Hoatson, Jr.; Barry L. Clark; William H. Page, II

[57] ABSTRACT

The hinge mechanism for supporting the back part of a vehicle seat for pivotal movement relative to a base part has first and second hinge arms secured respectively to the back part and base part and interconnected by an eccentric device. The eccentric device is rotatably supported on the first hinge arm and supports eccentrically a shaft integral with the second hinge arm. Rotation of the eccentric device by a handle moves the shaft laterally, and two sets of teeth secured respectively to the hinge arms are thereby moved into or out of mesh. A cam acting between the hinge arms maintains the teeth out of mesh while the back part is in a forward tilted position.

4 Claims, 3 Drawing Figures

VEHICLE SEAT HINGE MECHANISM

This invention relates to a hinge mechanism for mounting the seat back of a vehicle seat for pivotal movement relative to a seat base and for locking the seat back at any one of a plurality of selected inclinations.

According to the present invention there is provided a hinge mechanism for supporting the back part of a vehicle seat for pivotal movement relative to a base part and for locking it at a desired inclination thereto, said mechanism comprising first and second hinge arms, the second hinge arm being rigidly secured to a shaft perpendicular thereto, the shaft being rotatable within an eccentric supporting device mounted on the first hinge arm and operable to move the shaft laterally relative to the first hinge arm to bring two sets of teeth into or out of mutual engagement in any selected one of a plurality of rotational positions of the second hinge arm relative to the first hinge arm, each set of teeth being fixed relative to a separate one of said hinge arms.

The present invention also provides a hinge mechanism for supporting the back part of a vehicle seat for pivotal movement relative to a base part and for locking it at a desired inclination thereto, said mechanism comprising two hinge arms, a support plate mounted on and parallel spaced from a first one of said hinge arms, a shaft rigidly secured to the second of said hinge arms, the shaft extending through and journalled eccentrically within a rotational supporting device, the supporting device being journalled in apertures in the first hinge arm and in said support plate, an operating member connected to said supporting device for rotating said device relative to both said hinge arms thereby to displace the axis of said shaft laterally, a radial arm rigidly secured to said shaft and carrying a first set of teeth at its radially outer end, a second set of teeth fixed relative to said first hinge arm adjacent the first set of teeth, said teeth being disposed along an arc centred on the axis of said rotational supporting device, said sets of teeth being capable of meshing engagement with each other over a predetermined arc of relative movement of the two hinge arms.

The present invention further provides a hinge mechanism for supporting the back part of a vehicle seat for pivotal movement relative to a base part, the mechanism comprising two pivotally interconnected hinge arms, a first one of said arms being mounted on the second of said arms via an eccentric device which is operable by an operating member to move the pivot axis of the second hinge arm transversely relative to the first hinge arm to move one set of teeth into or out of mutual engagement with another set of teeth in any selected one of a plurality of rotational positions of the second hinge arm relative to the first hinge arm, each set of teeth being fixed relative to a separate one of said hinge arms, a spring biassing the operating member in a sense to urge the two sets of teeth into mutual engagement, and wherein a cam surface on one of said hinge arms is formed by upper and lower cam surface portions generally arcuate about the axis of said second hinge arm but separated by a step, the cam surface co-operating with an abutment fixed relative to the other hinge arm such that pivotal movement of the second hinge arm in one direction past a first predetermined position is prevented until the operating member has been moved sufficiently to relatively move the cam step clear of the abutment, after which the upper cam surface can ride on the abutment and hold the two sets of teeth out of mutual engagement without the assistance of the operating member.

One embodiment of a hinge mechanism in accordance with the present invention will now be described with reference to the accompanying drawings in which.

Figures 1, 2:
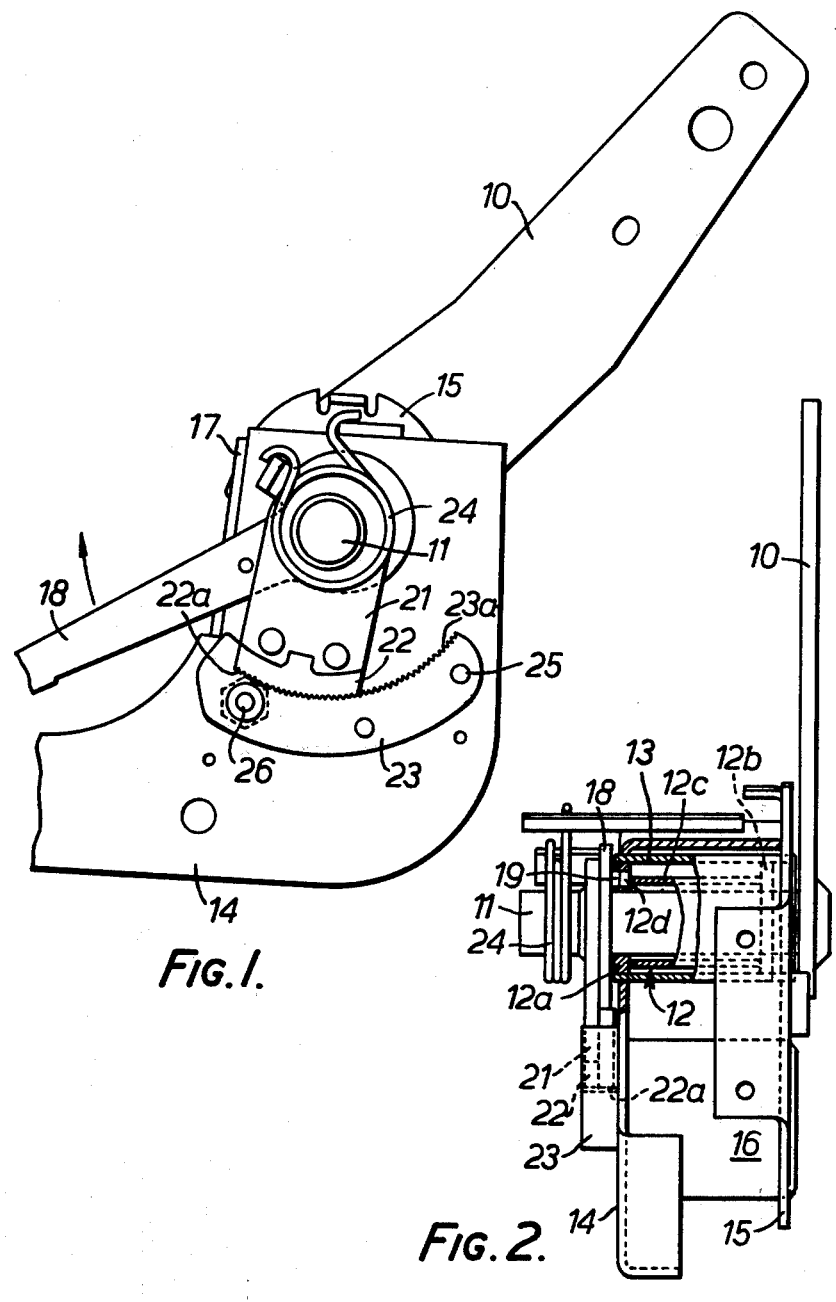
FIG. 1 is a side view of the mechanism.
FIG. 2 is a rear view of the mechanism of FIG. 1, part in section.

In a vehicle seat in which the seat back of the seat is to be mounted at a selected and variable inclination, it is conventional to provide a hinge mechanism at each side of the seat, one arm of each hinge mechanism being formed by a plate fixed to the seat base and the other arm of each hinge mechanism being fixed to the seat back, one of the hinge mechanism being formed as a lockable hinge mechanism, the other being a simple hinge mechanism or a second lockable hinge mechanism. In the latter event, both lockable mechanisms are preferably arranged to be operated simultaneously.

The lockable hinge mechanism includes two arcuate intermeshing rows of teeth, one row of teeth being mounted on the seat base arm of the hinge mechanism and the other being mounted on the seat back arm of the hinge mechanism. Means are provided for moving the two rows of teeth away from one another to allow the inclination of the seat back to be varied and to be brought back into mutual engagement to lock the seat back at the desired inclination. Separation of the two rows of teeth also enables the seat back to be tilted forwards to give access to the space behind the seat. This is useful either in a truck, where goods may be stored behind the seat, or in a two door passenger vehicle where access is required for passengers to the rear seats of the vehicle. In the forwardly inclined position, however, the two rows of teeth may be only in partial engagement with one another, and there is a danger that a load placed on the forwardly inclined seat might damage the two rows of teeth if they are only in partial engagement.

In the embodiment of the hinge mechanism illustrated in the accompanying drawings, a seat back arm 10 of the hinge mechanism is welded to one end of a pivot shaft 11 and extends radially therefrom. The shaft 11 is supported for rotation, about a horizontal axis, relative to a base plate 14 which forms the base arm of the hinge mechanism. The means for supporting the shaft comprise an eccentric member 12 formed by a spool having eccentric circular end flanges 12a, 12b, secured to an intermediate tube 12c, the shaft extending through the flanges and intermediate tube. The eccentric member is mounted for rotation within a bearing tube 13 extending between, and secured in apertures within, two parallel spaced vertical walls, one wall being the base plate 14 and the other by a supporting plate 15 which is connected to the base plate 14 by transverse plates 16, 17. The assembly of plates forms three sides of a box assembly.

On the side of the plate 14 remote from the seat back arm 10 (which will be the outer side of the hinge mechanism when assembled into a seat) an actuating handle 18 is formed by an elongate plate having a circular opening adjacent one end and a number of pins 19 (only one of which is visible in FIG. 2) spaced apart around the opening, the arm being fitted onto the pivot shaft 11 so that the shaft passes through the opening and the pins engage in corresponding apertures 12d in the adjacent end flange 12a of the eccentric member 12 to lock the actuating handle 18 to the member 12. Then when the handle is rotated, the eccentric member is rotated, pivot shaft 11 is caused to rise or fall with respect to base plate 14. A spring 24 connected to a point on the actuating handle is anchored to the base plate 14 of the hinge mechanism to bias the handle downwardly to a predetermined rotational position of the eccentric member corresponding to a fully lowered position of the pivot shaft 11.

A radial arm 21 is welded to the pivot shaft 11 on the outer side of the actuating handle 18, the radial arm extending downwardly from the pivot shaft 11 and carrying at its lower end an arcuate strip 22 of hardened metal. This strip 22 carries a row of teeth 22a which is arcuate about the axis of the pivot shaft for engagement with an arcuate row of teeth 23a formed on a second arcuate strip 23 of hardened metal. The second strip 23 is mounted by screws 25, 26 at its opposite ends on the base plate of the hinge mechanism. The two rows of teeth 22a, 23a enable the seat back arm 10 to be locked in any one of a plurality of selected inclined positions over the range of positions in which the two rows of teeth 22a, 23a can fully intermesh.

It will be evident that by lifting the actuating handle 18 and causing rotation of the eccentric member 12, the pivot shaft 11 and hence the radial arm can be moved vertically together with the seat back arm 10 from a locked position in which the two rows of teeth 22a, 23a are fully intermeshed to a released position in which the two rows of teeth are fully disengaged. The actuating handle 18 is biassed towards the locked position by its biassing spring 24, and in this position the seat back is rigidly supported. After movement of handle 18 to the released position, the inclination of the seat back can be varied, but if the handle is released while the seat back inclination is being adjusted, the spring 24 will rotate the handle 18 and eccentric member 12 back to re-engage the teeth and lock the seat back.

A spring (not shown) can be provided in this hinge mechanism or in the hinge mechanism on the opposite side of the seat to bias the seat back support arm 10 toward an upright position.

Figure 3:
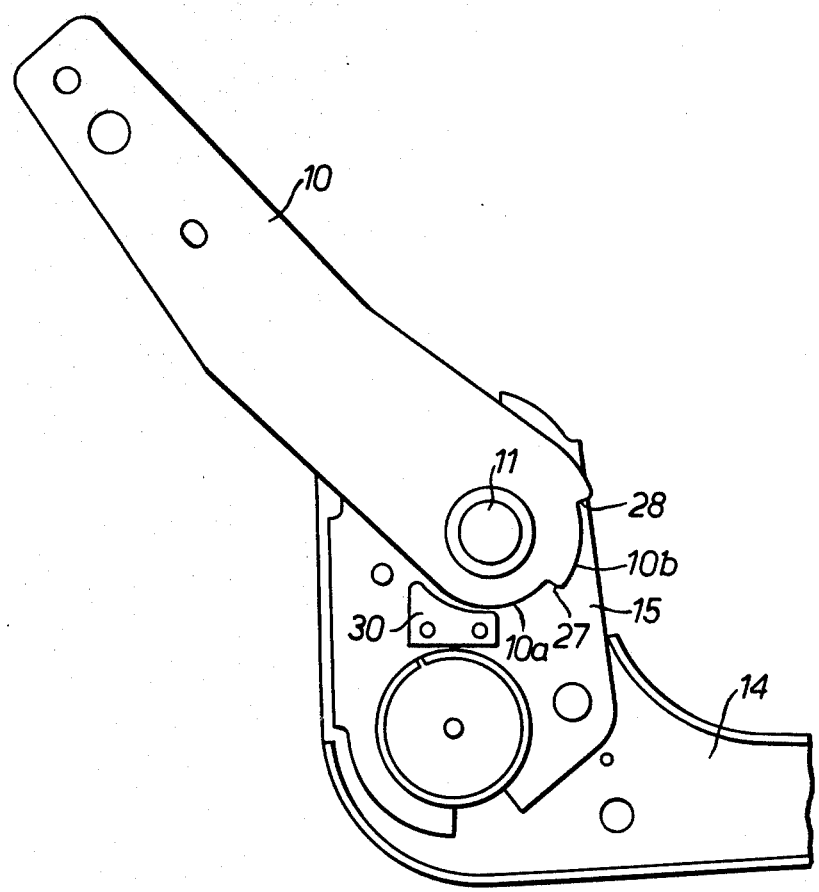
FIG. 3 is a view from the opposite side of the mechanism of FIG. 1.

The seat back arm 10, at its end which is welded to the pivot shaft, is formed with a peripheral cam surface which is generally arcuate about the axis of the pivot shaft. This surface comprises a first portion 10a (FIG. 3) arcuate about the pivot shaft axis which terminates in a first upward step 27, and a second portion 10b also arcuate about the pivot shaft axis, but at a greater radial distance therefrom, and terminating in a second upward step 28. The two steps 27, 28 are arranged for engagement with an abutment block 30 fixed to the adjacent side of the support plate 15 in such a position that the first step 27 engages or lies opposite the abutment block when the seat back arm 10 is in a substantially vertical position, and the second step 28 forms a forward stop for engaging the abutment block if the seat back arm 10 is forwardly inclined to an extreme position. The portion 10a of the peripheral surface of the seat back arm leading up to the first step 27 is located at a distance from the axis of the pivot shaft 11 such that when the two rows of teeth 22a, 23a are fully intermeshed, there is still clearance between surface portion 10a and the opposing surface of the abutment block 30. The height of the first step, however, is such that the first step 27 engages the abutment block 30 if the seat back is rotated from a rearwardly inclined position (as in FIG. 3) to an upright position with the two rows of teeth just out of engagement with each other. In order to lift the seat back arm 10 so that the first step 27 clears the abutment block 30, it is necessary for the actuating handle 18, and hence the eccentric member 12, to be rotated in a sense to raise the pivot shaft 11 and radial arm 21 and bring the two rows of teeth 22a, 23a further away from each other. When the first step 27 has cleared the abutment block 30, the surface 10b extending between the two steps, and which is arcuate about the axis of the pivot shaft, will ride on the abutment block and hold the two rows of teeth out of mutual engagement whether or not the actuating handle of the mechanism is released. Moreover this disengagement of the two rows of teeth will be maintained so long as the seat back arm 10 is tilted to a forward inclination.

If during the forward tilting movement of the seat back, the two rows of teeth 22a, 22a were allowed to come into mutual engagement, it is quite possible that a heavy load applied to the upper end of the seat back could result in very heavy loading of the two rows of teeth. This heavy loading could also be applied at a moment when only part of the teeth of one row is in engagement with only part of the teeth of the opposite row and so place a damaging strain on those teeth which are in mesh. By providing a cam surface around the portion 10b of the periphery of the seat back arm to hold the seat back arm in a raised position in which the two rows of teeth are out of mutual engagement while the seat back is forwardly inclined, this danger is obviated.

In returning the seat from its forwardly inclined position to an upright position, the peripheral cam surface portion 10b of the seat back arm 10 will ride on the abutment block 30 until the drop of the first step 27 is reached whereupon, unless the handle 18 is held in its raised position, the two sets of teeth will come into mesh and lock the seat back in an upright position. In order then to tilt the seat back rearwardly it is necessary to raise the actuating handle 18 and lower it when the seat back has reached its desired angle of rearward inclination.

Although reference has been made to an abutment block, this could take the form of a roller. Moreover the use of the words 'upward' or 'uper' and 'lower' in relation to the cam surfaces and steps are intended to imply only a relationship to the abutment and not to any direction in space.

In order to make minor adjustments to ensure that the two rows of teeth correctly intermesh when held against each other the arcuate strip 23, on which the longer row of teeth is formed, the screw 26 at one end is an eccentric screw which can be rotated to bring the two arcuate rows of teeth into even contact over their entire length.

The hinge mechanism to be provided on the opposite side of the seat can be similar to the hinge mechanism described above, in which event the two eccentrics will be coupled for rotation together. In practice, however, it is usually satisfactory for the second hinge mechanism to be a simple non-lockable hinge mechanism and the flexibility of the seat back will allow one side to be raised slightly without raising the opposite side.

Although reference has been made to a type of hinge mechanism in which the seat back arm of the hinge is raised relative to the seat base, the cam surface can alternatively co-operate with an abutment in a different type of hinge mechanism to hold the two co-operating rows of teeth out of mutual engagement during movement of the seat back arm, in forwardly inclined positions of the seat back.

I claim:

1. A hinge mechanism for supporting the back part of a vehicle seat for pivotal movement relative to a base part and for locking it at a desired inclination thereto, said mechanism comprising two hinge arms, a support plate mounted on and parallel spaced from a first one of said hinge arms, a shaft rigidly secured to the second of said hinge arms, a rotational supporting device journalled in apertures in the first hinge arm and in said support plate respectively, the shaft extending through and journalled within eccentric apertures in said supporting device, an operating member connected to said supporting device for rotating said device relative to both said hinge arms thereby to displace the axis of said shaft laterally, a radial arm rigidly secured to said shaft, a first set of teeth on the radially outer end of said radial arm, a second set of teeth fixed relative to said first hinge arm adjacent the first set of teeth, said first set of teeth being disposed along an arc centered on the axis of said rotational supporting device, said sets of teeth being capable of meshing engagement with each other over a predetermined arc of relative movement of the two hinge arms.

2. A hinge mechanism according to claim 1 wherein said supporting device is a tube having circular plates adjacent opposite ends thereof, and said shaft is journalled in corresponding eccentric apertures in said circular plates.

3. A hinge mechanism according to claim 1 including a spring biassing the operating member toward a position in which the two sets of teeth are held in mutual engagement.

4. A hinge mechanism according to claim 3 wherein a cam surface on one of said hinge arms is formed by upper and lower cam surface portions generally arcuate about the axis of said shaft but separated from each other by a step, an abutment co-operating with the cam surface and fixed relative to the other hinge arm such that pivotal movement of the second hinge arm in one direction past a first predetermined position is prevented until the operating member has been moved sufficiently to relatively move the cam step clear of the abutment, after which the upper cam surface can ride on the abutment and hold the two sets of teeth out of mutual engagement.

* * * * *